United States Patent
Bhamidipaty et al.

(10) Patent No.: US 8,195,489 B2
(45) Date of Patent: Jun. 5, 2012

(54) METHOD FOR COMPUTING AN ENTERPRISE PROCESS COMPLIANCE INDEX

(75) Inventors: Anuradha Bhamidipaty, Bangalore (IN); Shailabh Nagar, Bangalore (IN); Nanjangud C. Narendra, Bangalore (IN); Virendra K. Varshney, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 12/113,416

(22) Filed: May 1, 2008

(65) Prior Publication Data
US 2009/0276256 A1 Nov. 5, 2009

(51) Int. Cl.
*G06Q 10/00* (2012.01)
(52) U.S. Cl. ........ 705/7.11; 705/7.27
(58) Field of Classification Search .......... 705/7.11, 705/7.27
See application file for complete search history.

(56) References Cited

U.S. PATENT DOCUMENTS

| | | | |
|---|---|---|---|
| 7,603,283 B1 * | 10/2009 | Spielmann et al. | 705/7.28 |
| 2004/0073471 A1 | 4/2004 | Beresnevichiene | |
| 2005/0071185 A1 | 3/2005 | Thompson | |
| 2006/0156408 A1 | 7/2006 | Himberger et al. | |
| 2007/0094202 A1 | 4/2007 | Huang et al. | |

OTHER PUBLICATIONS

Compliance Aware Business Process Design Ruopeng Lu, Shazia Sadiq, Guido Governatori 3rd International Workshop on Business Process Design (BPD'07) Brisbaile, Sep. 24, 2007.*
Ruopeng Lu, et al., "Compliance Aware Business Process Design", http://espace.uq.edu.au/eserv.php?pid=UQ:34545&dsID=bpd2007.pdf.
Ahmad, S. et al., "Process Capability Analysis for Non-normal Quality Characteristics Using Gamma Distribution", 2007 4th International Conference on Information Technology New Generations, 2007, 6 pp., IEEE Comput. Soc, Los Alamitos, CA, USA.

* cited by examiner

*Primary Examiner* — William Rankins
(74) *Attorney, Agent, or Firm* — Ryan, Mason & Lewis, LLP

(57) ABSTRACT

Techniques for computing an enterprise process compliance index are provided. The techniques include obtaining an enterprise process, obtaining a compliance policy, segmenting the enterprise process into at least one process step and the compliance policy in at least one policy clause, and computing an enterprise process compliance index, wherein computing the enterprise process compliance index comprises determining an applicability of the at least one process step to the at least one policy clause.

21 Claims, 4 Drawing Sheets

METHOD FOR COMPUTING AN ENTERPRISE PROCESS COMPLIANCE INDEX

FIELD OF THE INVENTION

The present invention generally relates to information technology, and, more particularly, to process compliance.

BACKGROUND OF THE INVENTION

Information technology (IT) service delivery processes need to adhere to several regulations such as, for example, security, confidentiality and data integrity. These regulations are typically defined as policies, each of which contains a list of clauses. These are usually verified by periodic audits, which are usually ad-hoc, time-consuming and difficult to verify objectively.

An increasing focus for organizations is to organize their enterprise processes to comply with a growing list of regulations such as, for example, security guidelines, data integrity and confidentiality norms, etc. Enterprise processes and regulations are typically complex in nature and lack a formal approach to verify compliance. Audits are largely non-objective and compliance adherence is qualitatively assessed.

Existing approaches do not include developing enterprise process metrics from a compliance perspective. Current enterprise process metrics are inspired from existing software engineering design metrics. Existing approaches can include, for example, a design time measure proposed for a given process and a set of policies. However, such approaches focus on comparing different process models during design time with no motivation for run-time measurements of existing enterprise processes.

As a result, it is desirable to have a systematic approach to quantitatively determine the compliance posture of an organization, thus enabling one to quantitatively determine impact of improvements, guidance on investment decisions, comparative analysis, and differentiation with competition.

SUMMARY OF THE INVENTION

Principles of the present invention provide techniques for computing an enterprise process compliance index. An exemplary method (which may be computer-implemented) for computing an enterprise process compliance index, according to one aspect of the invention, can include steps of obtaining an enterprise process, obtaining a compliance policy, segmenting the enterprise process into at least one process step and the compliance policy in at least one policy clause, and computing an enterprise process compliance index, wherein computing the enterprise process compliance index comprises determining an applicability of the at least one process step to the at least one policy clause.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
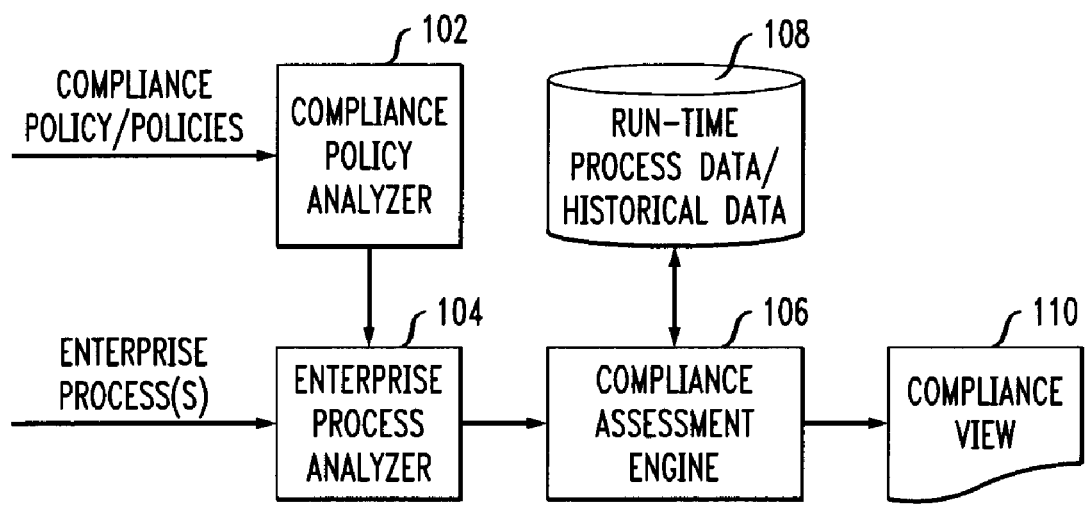
FIG. 1 is a diagram illustrating an exemplary approach, according to an embodiment of the present invention.

Principles of the present invention include techniques for computing an enterprise process compliance index, which can help to quantitatively describe the compliance posture of an organization. One or more embodiments of the invention include a compliance policy that can include a set of clauses that together define the requirements of a regulation. Clauses can be independently assessed for compliance on the steps of a process. One or more embodiments of the invention can also include an enterprise process that includes a set of nodes that are linked together with edges, having a start and stop node. The individual nodes of a process can be analyzed for applicability of policy clauses.

Also, principles of the present invention include a compliance measurement framework (CMF) by which compliance of the instances of a process model to a policy can be formally modeled and objectively measured. One element of CMF is a process policy compliance index (PPCI), the compliance score of a set of execution traces of a process model against the set of clauses of a single policy. This can be further extended to multi-PPCI, for multiple policies, and an organizational compliance index (OCI) for an aggregate score across the entire organization.

One or more embodiments of the invention focus on dynamic compliance checks where the above-noted indices are computed over several instances of process execution. By using enough instances of execution, the resulting index reflects the real state of non-compliance while also increasing the probability of all relevant paths within the process model being followed.

In one or more embodiments of the present invention, input for the techniques described herein can include, for example, a compliance policy and an enterprise process, while the output can include, for example, a degree of policy (clause) compliance at each of the nodes of the process that is evaluated and aggregated over the entire process (or a set) to view the compliance posture of an organization.

As described herein, in contrast to the disadvantageous existing approaches, one or more embodiments of the present invention include a systematic approach to quantitatively determine the compliance posture of an organization. Such an approach can, for example, represent a compliance policy as a set of clauses that can be independently assessed for compliance independent of the method used to assess individual steps of a process. One or more embodiments of the invention capture the complexity of the process and vagueness of a compliance policy by systematic breakdown into process steps and policy clauses and their applicability thereto, as well as compute the compliance index for one enterprise process or a set.

The techniques described herein include the use of a compliance policy and an enterprise process of an organization. As noted herein, the compliance policy can include, for example, a set of clauses which define the requirements of a regulation. Also, an enterprise process can include, for example, a set of nodes that are linked together with edges, having a start and stop node. The compliance policy and the enterprise process can be compared to determine the degree of policy (clause) compliance at each node of the enterprise process. This can be further aggregated over the entire process (or a set) to view the compliance posture of the organization.

FIG. 1 is a diagram illustrating an exemplary approach, according to an embodiment of the present invention. By way of illustration, FIG. 1 depicts the elements of a compliance policy analyzer 102, an enterprise process analyzer 104, a compliance assessment engine 106, run-time process data and/or historical data 108 and a compliance view 110. The compliance policy analyzer 102 analyzes the compliance policy to identify the clauses of the policy which can be independently assessed for compliance evaluation. The enterprise process analyzer 104 analyzes an enterprise process to identify the clauses applicable for the process at each of the steps.

The compliance assessment engine 106 computes the degree of compliance of the process steps with the clauses applicable and aggregates the measure for the enterprise process (or a set of enterprise processes). Also, the compliance view 110 provides a drill-down view of the compliance index for the given enterprise process(s). The run-time process data/historical data 108 provides the execution results of the process steps, along with the data of which clauses in the policy have been adhered to (or not) in the process.

Figure 2:
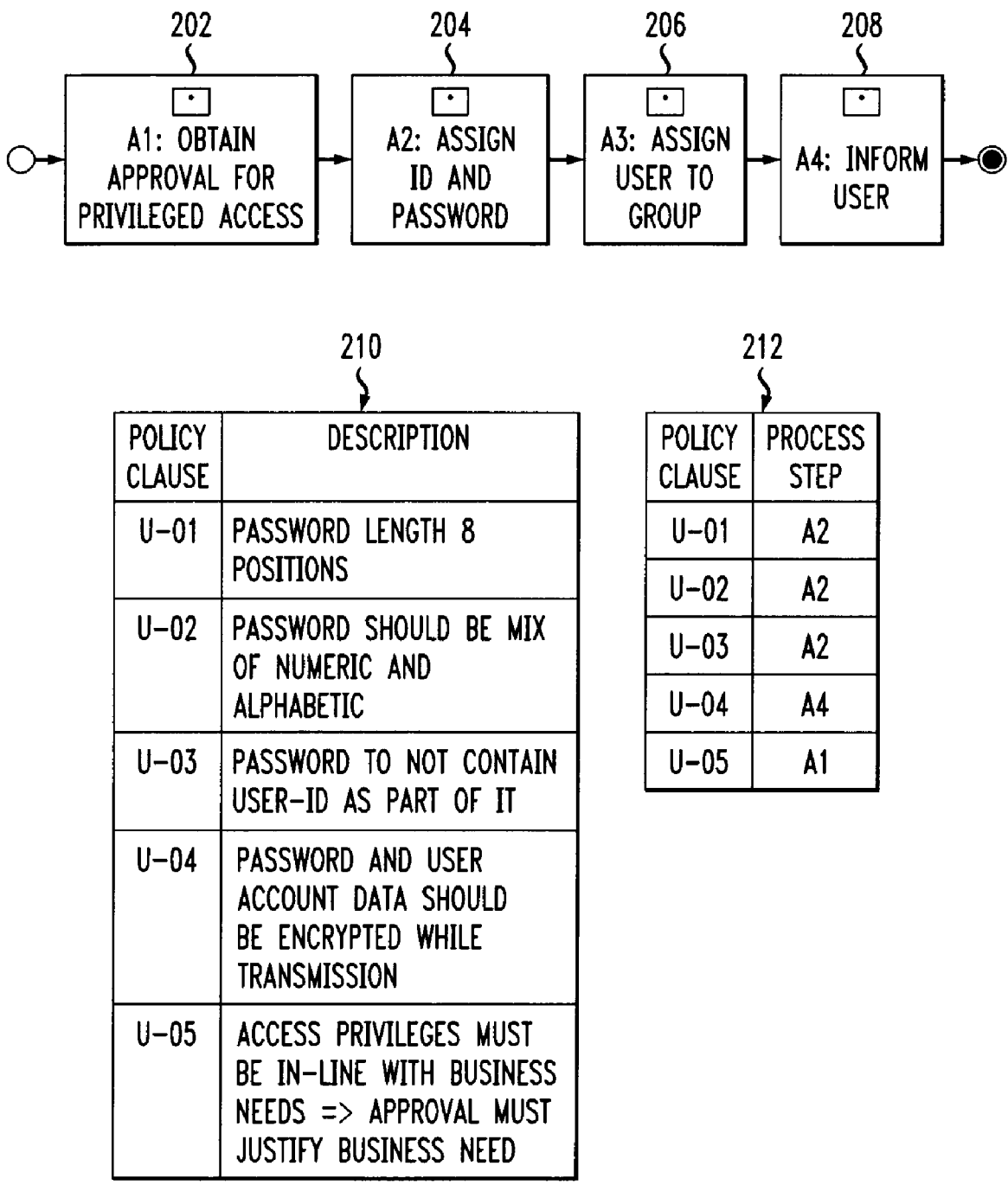
FIG. 2 is a diagram illustrating techniques for computing a process compliance index, according to an embodiment of the present invention.

FIG. 2 is a diagram illustrating techniques for computing a process compliance index, according to an embodiment of the present invention. By way of illustration, FIG. 2 depicts the steps of obtaining approval for privileged access in step 202, assigning identification (ID) and password in step 204, assigning a user to a group in step 206 and informing the user of their ID and password in step 208. FIG. 2 also depicts the elements of a policy clause description table 210 and a policy cause process step table 212.

The techniques depicted in FIG. 2 can be, for example, a user administration process that manages and provides user access to certain mission-critical applications.

Several considerations arise when providing users access to potentially sensitive information. For example, users need to be provided an unbreakable password, all password-related communications with them need to be encrypted, and users should only be granted access to those parts of the network for which they have a demonstrable enterprise need. Such items are depicted below in Table 1 in the form of a simplified version of a security policy for user administration.

TABLE 1

Security Policy for User Administration
Clause Description $U_{01}$: User passwords should be at least 8 characters in length
$U_{02}$: Each user password should be a mix of numeric and alphabetic
$U_{03}$: User passwords should not contain the user ID as part of the password TABLE 1-continued Security Policy for User Administration
Clause Description $U_{04}$: Passwords and user account details should be encrypted during transmission
$U_{05}$: Access privileges must be in-line with enterprise needs It should be noted that the security policy represents a non-functional objective of the process in that managing user access can be done without adhering to the policy. Additionally, most of the tasks of the user administration process involve human activities because they cannot be fully automated. Together, this raises the possibility of mistakes and "short cuts," which necessitates conducting regular process audits to detect and correct non-compliance issues.

Not all clauses may be equally critical for meeting security regulations. This raises the idea of a weight to be assigned to each policy clause, which is described herein.

The PPCI of a process model against a policy can be defined as:

$$c_{def}\left(1 - \frac{\sum_{j=1}^{M} \gamma_j}{M}\right) \quad (1)$$

where M=number of process instances, $c_{def} \in [0,1]$ is the degree of compliance of the process definition and $\gamma_j \in [0,1]$ is the non-compliance of a process instance with the policy. One can assume $c_{def}$ to be 1 because the process definition is assumed to be perfectly compliant with the policy (of course, as described herein, different instances of the same process definition may not comply fully with the policy, which raises the need for evaluating compliance). The above equation therefore calculates the overall degree of compliance of the chosen set of process instances with the policy clauses.

$\gamma_j$ can be defined by:

$$\gamma_j = \frac{\sum_{i=1}^{N} W_i * D_{i,j}}{\sum_{i=1}^{N} W_i} \quad (2)$$

where N equals the number of clauses in the concerned policy, $W_i$ measures the weight of the $i^{th}$ policy clause, and $D_{i,j}$ is the degree of non-compliance of the $i^{th}$ policy clause in the $j^{th}$ process instance. A $D_{i,j}$ value of 1 indicates that the compliance of a clause at a process task completely failed, whereas a value of 0 indicates that the process task is fully compliant to the policy clause. Any value between 0 and 1 indicates partial compliance to the clause.

One or more embodiments of the present invention include a policy-equivalent process representation. The policy-equivalent representation of a process (definition or instance) is a convenient mechanism for representing and reasoning about non-compliance of the process with respect to the policy clauses.

Figure 3:
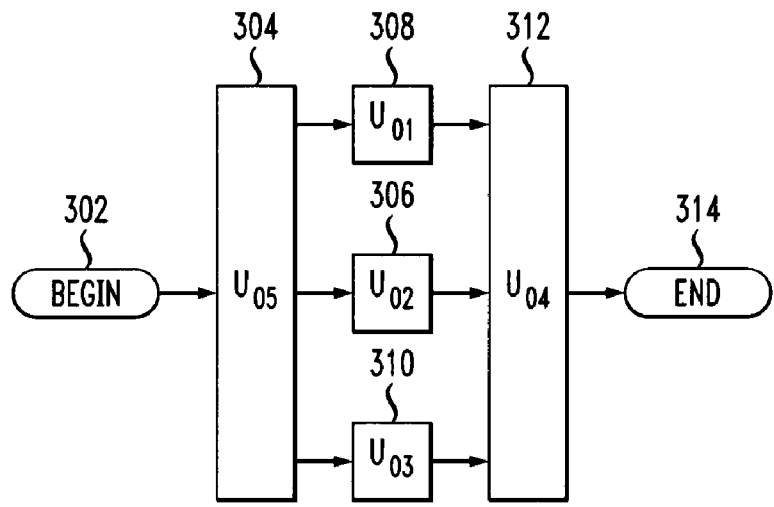
FIG. 3 is a diagram illustrating a policy-equivalent representation of an add user process, according to an embodiment of the present invention.

One can apply the following transformations. First, if a clause $U_i$ is applicable to a single task $T_j$ and not to any other task, then one can replace $T_j$ by $U_i$. Second, if a clause $U_i$ is applicable to a set of tasks $\{T_j\}$ then the last task in the set, that is, that task which is not a (direct or indirect) predecessor of any other task in the set, is replaced by $U_i$. Finally, if a set of clauses $\{U_i\}$ applies to a single task $T_j$, then the task is represented as a parallel combination of tasks representing the $U_i$, with the following caveat: if $T_j$ is not the last applicable for any clause $U_i$, then that clause is not represented. FIG. 3 depicts the policy-equivalent representation of our "Add User" process.

FIG. 3 is a diagram illustrating a policy-equivalent representation of an add user process, according to an embodiment of the present invention. By way of illustration, FIG. 3 depicts the elements of a beginning 302, $U_{05}$ 304, $U_{02}$ 306, $U_{01}$ 308, $U_{03}$ 310, $U_{04}$ 312 and an ending 314.

One or more embodiments of the invention include calculating the weight of each clause. For example, one can use a two-step approach towards the computation of the weight. In the first step, one can assume the existence of a basic weight $W_i^{basic}$ for each clause $c_i$, so that the following holds for all the clauses in the policy: $\Sigma W_i^{basic}=1$. The basic weight assignment captures the intuition that some clauses matter more than others, by definition. In the next step, one can compute the adjusted weight of a clause by considering the dependency among the clauses in the process.

One can also, for example, model the policy-equivalent representation as a directed graph, with a directed edge $L_i \rightarrow L_j$ for every pair of nodes where $L_j$ is a direct successor of $L_i$. Let the clause in question be $L_k$. As such, a backward topological sort of this graph starting at $L_k$ and ending at the start node of the graph (nodes occurring in parallel can be ordered arbitrarily) will yield an ordered set of clauses $L_p$, $1<=p<=m$. Let the basic weight of each such clause $L_p$, be $b_p$. Without loss of generality, one can add $L_k$ to this set, and label it $L_{m+1}$. As such, the adjusted weight of $L_k$ is calculated as per the following recursive function:

$$W_1 = b_1$$

$$W_2 = b_2*(1+(D_{1,j}*b_1)), \text{ and}$$

for all $k \in [3, m+1]$, $$W_k = b_k*(1+(\Sigma_{q=2}^{k-1} D_{q-1,j}*b_{q-1}))$$

The final output of this recursive function is the adjusted weight of $L_k$.

By way of example, described below are three instances of the process execution having different values of non-compliance, $D_{i,j}$, at each of the process tasks. Table 2 depicts the values of $D_{i,j}$ for the three instances of process execution. Adjusted weights $W_i$ for the clauses in each of the scenarios and the overall PPCI value are depicted in Table 3.

TABLE 2

| | Scenarios | | |
|---|---|---|---|
| Clause | Di1 | Di2 | Di3 |
| U05 | 0 | 1 | 0 |
| U01 | 0 | 0 | 0 |
| U02 | 0 | 0 | 1 |
| U03 | 1 | 1 | 1 |
| U04 | 1 | 1 | 1 |

TABLE 3

| | Computation | | |
|---|---|---|---|
| Clauses | Wi1 | Wi2 | Wi3 |
| U05 | 0.25 | 0.25 | 0.25 |
| U01 | 0.25 | 0.375 | 0.25 |
| U02 | 0.375 | 0.25 | 0.25 |

TABLE 3-continued

| | Computation | | |
|---|---|---|---|
| Clauses | Wi1 | Wi2 | Wi3 |
| U03 | 0.125 | 0.125 | 0.1 |
| U04 | 0.2025 | 0.2025 | 0.2025 |
| Non-compliance | 0.27 | 0.44 | 0.53 |
| PPCI | | 0.587 | |

Among the second and third instances, each violates three clauses, with the second instance violating $U_{05}$ (earlier in the process) and the third instance violating $U_{02}$ (later in the process). Hence, all things being equal, the non-compliance score of the second instance should be measurably higher than that of the third instance. However, it should be noticed that it is actually the reverse (0.44 versus 0.53). This is because while the basic weight of \texttt{$U\_{02}$} is higher (that is, 0.25) than that of $U_{05}$ (that is, 0.15), one can see that $U_{02}$ applies later in the process than U05 does. As such, the non-compliance of $U_{05}$ propagates longer through the process than that of $U_{02}$. These findings also suggest the useful process design practice of ensuring that the tasks that apply to clauses with lower ranked basic weights should be implemented as early in the process as possible.

Figure 4:
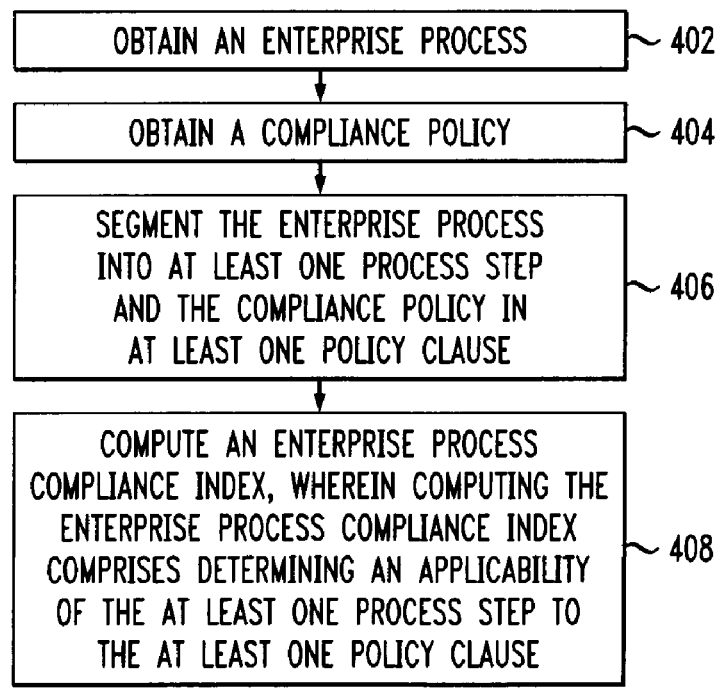
FIG. 4 is a flow diagram illustrating techniques for computing an enterprise process compliance index, according to an embodiment of the present invention.

FIG. 4 is a flow diagram illustrating techniques for computing an enterprise process compliance index, according to an embodiment of the present invention. Step 402 includes obtaining an enterprise process. The enterprise process can include a set of nodes that are linked together with one or more edges, and wherein the nodes comprise at least a start and a stop node. Step 404 includes obtaining a compliance policy. The compliance policy can include a set of policy clauses that together define requirements of a regulation. Step 406 includes segmenting the enterprise process into at least one process step and the compliance policy in at least one policy clause. Step 408 includes computing an enterprise process compliance index, wherein computing the enterprise process compliance index comprises determining an applicability of the at least one process step to the at least one policy clause.

The techniques depicted in FIG. 4 can also include, for example, independently assessing each policy clause for compliance on the process steps, as well as analyzing each node of a process for applicability of each of the policy clauses. One or more embodiments of the invention can also include, for example, determining a policy-equivalent process representation to represent non-compliance of a process with respect to at least one policy clause. Additionally, one or more embodiments of the invention can include, for example, computing a weight of a policy clause, wherein the weight of a clause indicates a level of dependency among the policy clauses in the enterprise process.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
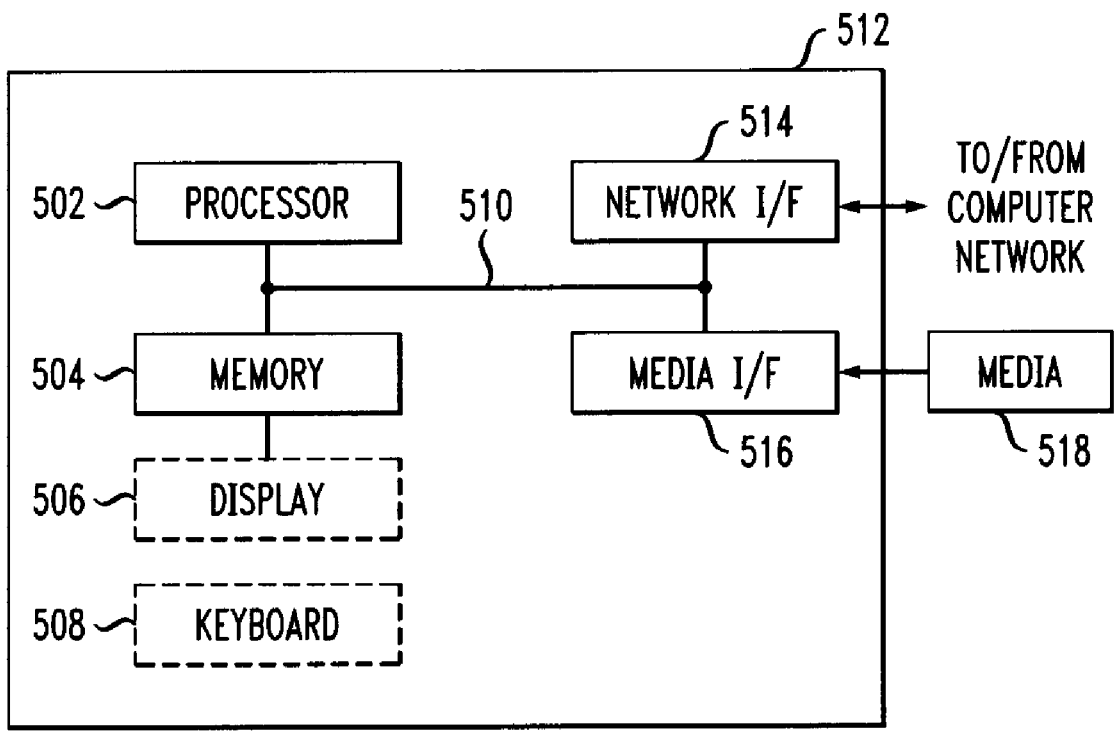
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, capturing the complexity of the process and vagueness of a compliance policy by the systematic breakdown into process steps and policy clauses, and their applicability thereto.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for computing an enterprise process compliance index, comprising the steps of:
   obtaining an enterprise process, wherein obtaining an enterprise process is carried out by an enterprise process analyzer module executing on a hardware processor;
   obtaining a compliance policy, wherein obtaining a compliance policy is carried out by a compliance policy analyzer module executing on a hardware processor;
   segmenting the enterprise process into at least one process step and the compliance policy into at least one policy clause, wherein segmenting the enterprise process is carried out by an enterprise process analyzer module executing on a hardware processor; and
   dynamically computing an enterprise process compliance index of a running enterprise process, wherein computing the enterprise process compliance index comprises determining an applicability of the at least one process step to the at least one policy clause over multiple instances of process execution during run time, wherein computing an enterprise process compliance index is carried out by a compliance assessment engine module executing on a hardware processor.

2. The method of claim 1, wherein the compliance policy comprises a set of one or more policy clauses that together define one or more requirements of a regulation.

3. The method of claim 1, further comprising independently assessing the at least one policy clause for compliance on the at least one process step.

4. The method claim 1, wherein the enterprise process comprises a set of one or more nodes that are linked together with one or more edges, and wherein the one or more nodes comprise at least a start and a stop node.

5. The method of claim 4, further comprising analyzing each node of a process for applicability of each of the at least one policy clause.

6. The method of claim 1, further comprising determining a policy-equivalent process representation to represent non-compliance of a process with respect to at least one policy clause.

7. The method of claim 1, further comprising computing a weight of a policy clause, wherein the weight of a clause indicates a level of dependency among the at least one policy clause in the enterprise process.

8. A computer program product comprising a tangible computer readable recordable storage medium having computer readable program code for computing an enterprise process compliance index, said computer program product including:
- computer readable program code for obtaining an enterprise process;
- computer readable program code for obtaining a compliance policy;
- computer readable program code for segmenting the enterprise process into at least one process step and the compliance policy into at least one policy clause; and
- computer readable program code for dynamically computing an enterprise process compliance index of a running enterprise process, wherein computing the enterprise process compliance index comprises determining an applicability of the at least one process step to the at least one policy clause over multiple instances of process execution during run time.

9. The computer program product of claim 8, wherein the compliance policy comprises a set of one or more policy clauses that together define one or more requirements of a regulation.

10. The computer program product of claim 8, further comprising computer readable program code for independently assessing the at least one policy clause for compliance on the at least one process step.

11. The computer program product of claim 8, wherein the enterprise process comprises a set of one or more nodes that are linked together with one or more edges, and wherein the one or more nodes comprise at least a start and a stop node.

12. The computer program product of claim 11, further comprising computer readable program code for analyzing each node of a process for applicability of each of the at least one policy clause.

13. The computer program product of claim 8, further comprising computer readable program code for determining a policy-equivalent process representation to represent non-compliance of a process with respect to at least one policy clause.

14. The computer program product of claim 8, further comprising computer readable program code for computing a weight of a policy clause, wherein the weight of a clause indicates a level of dependency among the at least one policy clause in the enterprise process.

15. A system for computing an enterprise process compliance index, comprising:
- a memory; and
- at least one processor coupled to said memory and operative to:
  - obtain an enterprise process;
  - obtain a compliance policy;
  - segment the enterprise process into at least one process step and the compliance policy into at least one policy clause; and
  - dynamically compute an enterprise process compliance index of a running enterprise process, wherein computing the enterprise process compliance index comprises determining an applicability of the at least one process step to the at least one policy clause over multiple instances of process execution during run time.

16. The system of claim 15, wherein the compliance policy comprises a set of one or more policy clauses that together define one or more requirements of a regulation.

17. The system of claim 15, the at least one processor coupled to said memory is further operative to independently assess the at least one policy clause for compliance on the at least one process step.

18. The system of claim 15, wherein the enterprise process comprises a set of one or more nodes that are linked together with one or more edges, and wherein the one or more nodes comprise at least a start and a stop node.

19. The system of claim 15, wherein the at least one processor coupled to said memory is further operative to determine a policy-equivalent process representation to represent non-compliance of a process with respect to at least one policy clause.

20. The system of claim 15, wherein the at least one processor coupled to said memory is further operative compute a weight of a policy clause, wherein the weight of a clause indicates a level of dependency among the at least one policy clause in the enterprise process.

21. A method for computing an organizational compliance index, comprising the steps of:
- obtaining a set of multiple enterprise processes across an organization, wherein obtaining an enterprise process is carried out by an enterprise process analyzer module executing on a hardware processor;
- obtaining a set of multiple compliance policies across the organization, wherein obtaining a compliance policy is carried out by a compliance policy analyzer module executing on a hardware processor;
- segmenting each enterprise process into at least one process step and each compliance policy into at least one policy clause, wherein segmenting each enterprise process is carried out by an enterprise process analyzer module executing on a hardware processor; and
- dynamically computing an organizational compliance index, wherein computing the organizational compliance index comprises determining an applicability of each of the at least one process step to each of the at least one policy clause over multiple instances of process execution during run time to determine an aggregate compliance score across the organization, wherein computing an enterprise process compliance index is carried out by a compliance assessment engine module executing on a hardware processor.

* * * * *